United States Patent
Barsness et al.

(10) Patent No.: US 9,934,271 B2
(45) Date of Patent: Apr. 3, 2018

(54) DATABASE QUERY OPTIMIZER THAT TAKES NETWORK CHOICE INTO CONSIDERATION

(75) Inventors: Eric L. Barsness, Pine Island, MN (US); David L. Darrington, Rochester, MN (US); Amanda Randles, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1171 days.

(21) Appl. No.: 13/448,483

(22) Filed: Apr. 17, 2012

(65) Prior Publication Data

US 2012/0203763 A1    Aug. 9, 2012

Related U.S. Application Data

(63) Continuation of application No. 11/566,723, filed on Dec. 5, 2006, now Pat. No. 8,229,955.

(51) Int. Cl.
*G06F 17/30* (2006.01)

(52) U.S. Cl.
CPC .. *G06F 17/30442* (2013.01); *G06F 17/30545* (2013.01)

(58) Field of Classification Search
CPC ................. G06F 17/30545; G06F 17/30442
USPC .................. 707/721; 3/721; 709/227, 249
See application file for complete search history.

(56) References Cited

U.S. PATENT DOCUMENTS

| | | | |
|---|---|---|---|
| 6,032,143 A | 2/2000 | Leung et al. | |
| 6,081,801 A | 6/2000 | Cochrane et al. | |
| 6,112,198 A | 8/2000 | Lohman et al. | |
| 6,359,901 B1* | 3/2002 | Todd | H04L 43/0852 370/465 |
| 6,438,579 B1 | 8/2002 | Hosken | |
| 6,470,335 B1 | 10/2002 | Marusak | |
| 6,778,987 B1 | 8/2004 | Wynblatt et al. | |
| 6,810,259 B1 | 10/2004 | Zhang | |
| 6,931,392 B1 | 8/2005 | Skeen | |
| 7,467,198 B2 | 12/2008 | Goodman et al. | |
| 7,509,330 B2* | 3/2009 | Ewing et al. | |
| 7,577,154 B1* | 8/2009 | Yung et al. | 370/400 |
| 7,668,809 B1* | 2/2010 | Kelly et al. | 707/713 |
| 7,966,331 B2* | 6/2011 | Gardner | G06Q 40/08 707/738 |
| 8,060,084 B2* | 11/2011 | Buckley et al. | 455/432.1 |
| 2002/0143755 A1* | 10/2002 | Wynblatt et al. | 707/3 |

(Continued)

*Primary Examiner* — Boris Gorney
*Assistant Examiner* — Bao Tran
(74) *Attorney, Agent, or Firm* — Martin & Associates, LLC; Derek P. Martin

(57) ABSTRACT

In a networked computer system that includes multiple nodes and multiple networks interconnecting the nodes, a database query optimizer takes network choice into consideration when optimizing a query. The query optimizer logs historical information for queries that includes network information. A network monitor determines network characteristics of the multiple networks. The query optimizer then selects a network for a query based on the network characteristics, and optionally based on the historical information as well. The result is a query optimizer that takes network choice into consideration, thereby providing a query that is optimized according to the characteristics of the networks.

14 Claims, 5 Drawing Sheets

(56) References Cited

U.S. PATENT DOCUMENTS

| | | | |
|---|---|---|---|
| 2002/0156792 A1* | 10/2002 | Gombocz | G06F 17/30286 |
| 2003/0208621 A1 | 11/2003 | Bowman | |
| 2003/0212668 A1 | 11/2003 | Hinshaw et al. | |
| 2004/0019581 A1 | 1/2004 | Davis et al. | |
| 2004/0059702 A1 | 3/2004 | Hepner et al. | |
| 2004/0067758 A1 | 4/2004 | Laiho | |
| 2005/0066033 A1* | 3/2005 | Cheston et al. | 709/225 |
| 2005/0125414 A1 | 6/2005 | Navas et al. | |
| 2005/0141525 A1* | 6/2005 | Rose | H04L 29/06 |
| | | | 370/401 |
| 2005/0192937 A1 | 9/2005 | Barsness et al. | |
| 2005/0246231 A1* | 11/2005 | Shkedi | G06Q 30/02 |
| | | | 705/14.73 |
| 2005/0254435 A1* | 11/2005 | Moakley et al. | 370/252 |
| 2006/0088014 A1 | 4/2006 | Ganesh | |
| 2006/0165040 A1 | 7/2006 | Rathod et al. | |
| 2006/0248045 A1 | 11/2006 | Toledano et al. | |
| 2007/0156667 A1 | 7/2007 | Li et al. | |
| 2008/0229244 A1* | 9/2008 | Markus et al. | 715/811 |
| 2011/0145383 A1 | 6/2011 | Bishop et al. | |
| 2012/0063323 A1* | 3/2012 | Mortier et al. | 370/241 |

\* cited by examiner

DATABASE QUERY OPTIMIZER THAT TAKES NETWORK CHOICE INTO CONSIDERATION

BACKGROUND

1. Technical Field

This disclosure generally relates to database query optimizations, and more specifically relates to a query optimizer that takes network choice into consideration when executing a query in a system that includes multiple nodes and multiple network paths.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A database query typically includes one or more predicate expressions interconnected with logical operators. Database query optimizers have been developed that evaluate queries and determine how to best execute the queries based on a number of different factors that affect query performance. However, none of the known query optimizers take into account the choice of network in executing a query. As a result, known query optimizers cannot optimize a query based on characteristics of multiple networks.

BRIEF SUMMARY

In a networked computer system that includes multiple nodes and multiple networks interconnecting the nodes, a database query optimizer takes network choice into consideration when optimizing a query. The query optimizer logs historical information for queries that includes network information. A network monitor determines network characteristics of the multiple networks. The query optimizer then selects a network for a query based on the network characteristics, and optionally based on the historical information as well. The result is a query optimizer that takes network choice into consideration, thereby providing a query that is optimized according to the characteristics of the networks.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

Figure 1:
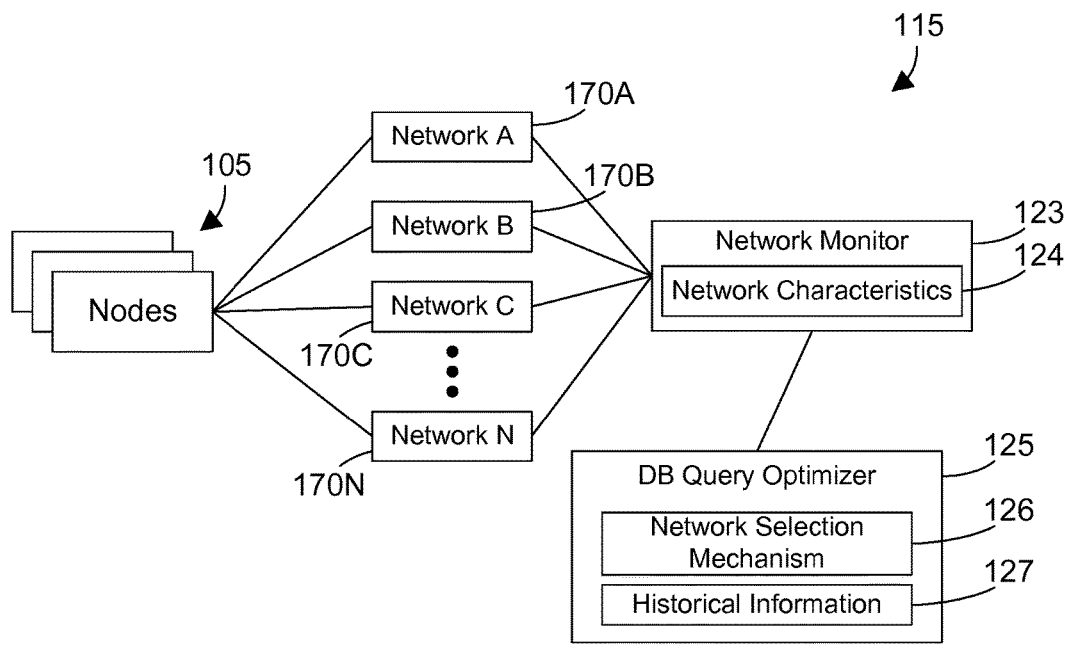
FIG. 1 is a block diagram of a networked computer system that includes a query optimizer that takes network choice into consideration when optimizing a database query.
Figure 3:
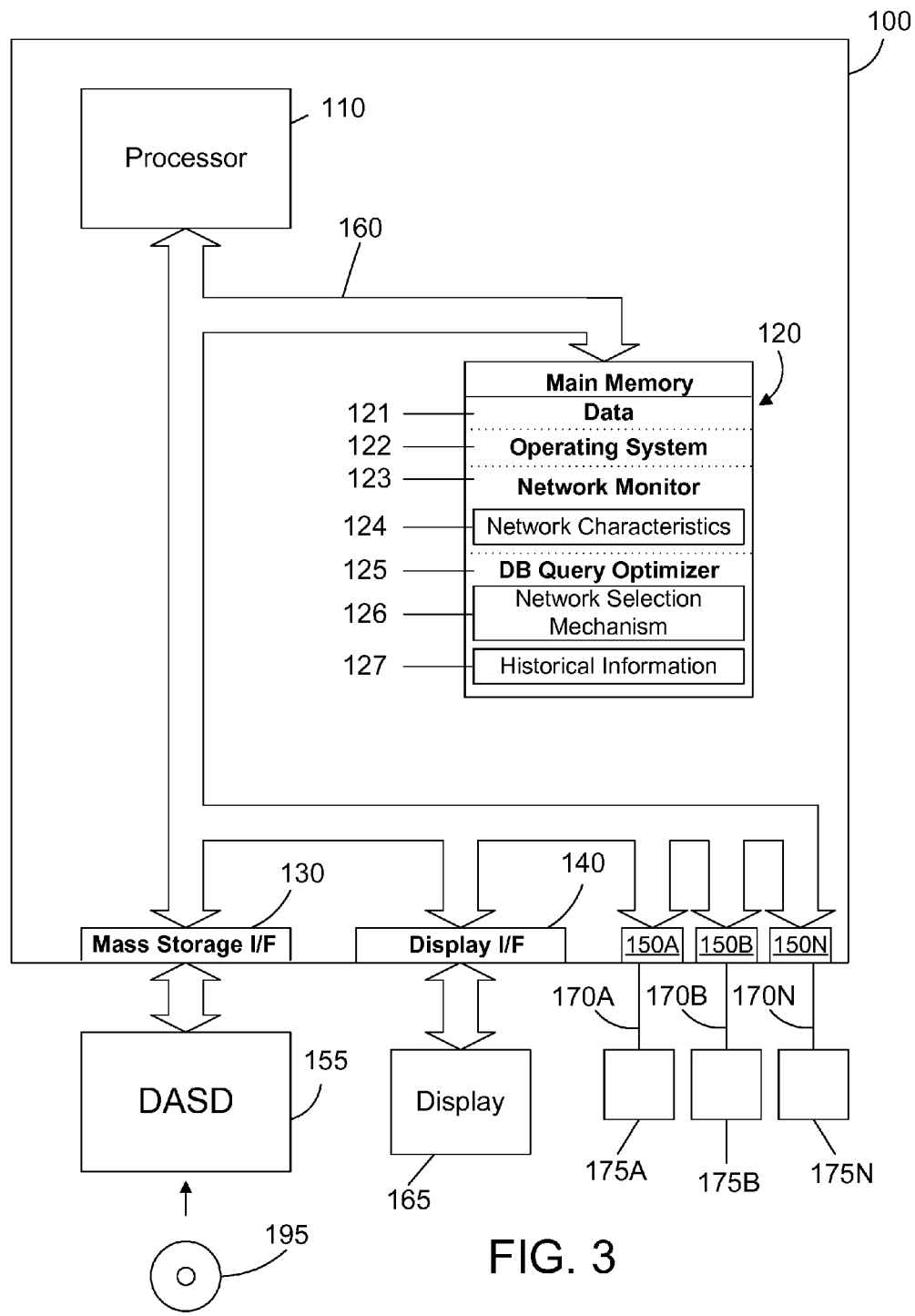
FIG. 3 is a block diagram of a computer system in accordance with the preferred embodiments that is coupled to multiple other computer systems (or nodes) via multiple networks.
Figures 7, 8:
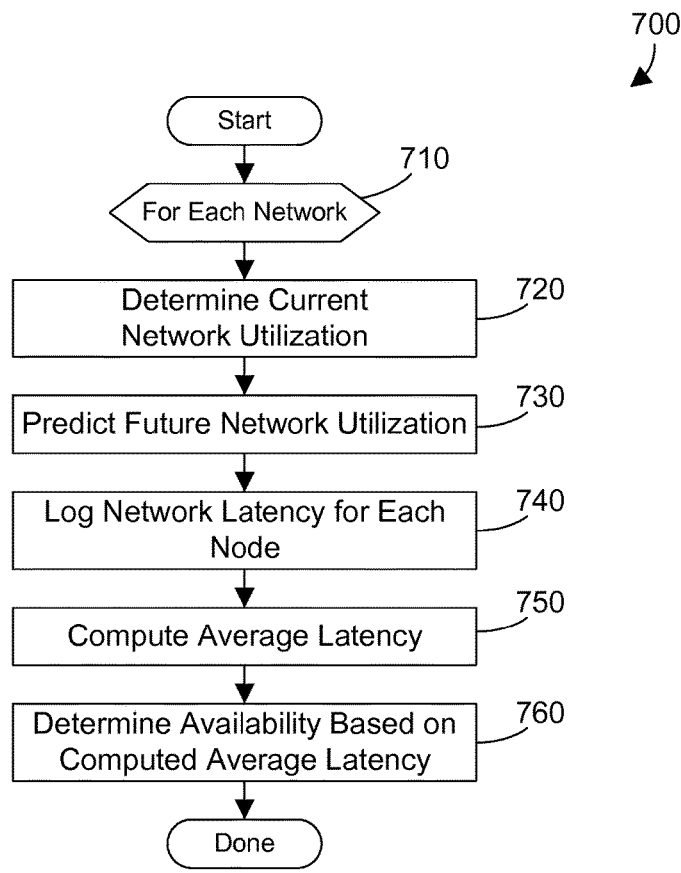

FIG. 7 is a flow diagram of a method for the network monitor 123 in FIGS. 1 and 3 to determine and store network characteristics; and FIG. 8 is a table of network file records that represents one specific implementation for the network characteristics 124 shown in FIGS. 1 and 3.

DETAILED DESCRIPTION

Computer systems have been developed that include multiple nodes coupled to each other via multiple different network paths. The BlueGene supercomputer family developed by IBM includes thousands of compute nodes coupled together via multiple different networks. For example, in the BlueGene architecture, nodes are interconnected by both a torus network and a logical tree network. The torus network connects the nodes in a three-dimensional mesh with wrap around links. The logical tree network connects all nodes in a binary tree configuration, where each node has a parent and two children, although some nodes may have one or zero children, depending on the hardware configuration. In the BlueGene architecture, the torus and logical tree networks are independent networks, which means they do not share network resources such as links or packet injection FIFOs.

When nodes are interconnected with different independent networks, as in the case of the BlueGene architecture, the choice of which network to use can affect the performance of database queries that include other nodes. As a result, a query optimizer can now take into account the choice of network when executing a database query. Known query optimizers take many things into consideration when optimizing a database query, but no known query optimizer has taken network choice into consideration when executing a query.

The claims and disclosure herein provide a query optimizer that takes network choice into consideration when executing a query. The query optimizer logs historical information for queries that indicates past network selection when executing a query. A network monitor determines network characteristics for each of the networks. The query optimizer may then select a network based on attributes of the query itself, based on the historical information, and based on the network characteristics. The result is a query optimizer that can more optimally execute queries by taking network choice into consideration when executing a query on a node in a networked computer system that is coupled via multiple networks to other nodes.

Referring to FIG. 1, a system 115 is shown to include multiple nodes 105 coupled together via multiple networks, shown in FIG. 1 as 170A, 170B, 170C, . . . , 170N. The multiple networks are also coupled to a network monitor 123 that monitors the networks and determines suitable network characteristics 124. A database query optimizer 125 logs historical information 127 that includes choice of network information when the query optimizer 125 executes a query. A network selection mechanism 126 selects a network for a query based on the network characteristics 124 and/or the historical information 127. The result is a query optimizer 125 that takes network choice into consideration when executing a query. In the most preferred implementation, the multiple networks are independent networks so a problem with one network does not affect the function of a different network. However, networks that are not independent may also be used.

Figure 2:
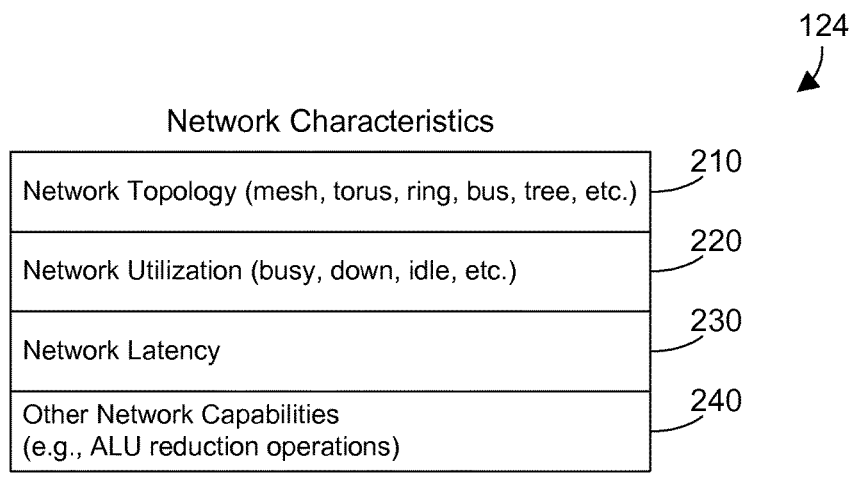
FIG. 2 is a table of possible network characteristics 124 that could be determined by the network monitor 124 in FIG. 1.

Some specific examples of network characteristics 124 are shown in the table of FIG. 2. Network characteristics 124 may include network topology items 210 that characterize a network, such as mesh, torus, ring, bus, tree, etc. Network utilization 220 may indicate whether a network is busy, down, idle, etc. Network latency 230 indicates delays on the network. Other network capabilities 240 may also be specified, such as Arithmetic Logic Unit (ALU) reduction operations. While some specific examples of network characteristics are shown in FIG. 2, the disclosure and claims herein expressly extend to network characteristics that include any suitable parameter or metric that can describe or otherwise characterize a network.

Referring to FIG. 3, a computer system 100 is one suitable implementation of a computer system that may be a node in a networked computer system that interconnects multiple nodes via multiple networks, and includes a query optimizer that takes network choice into consideration when executing a database query. Computer system 100 is an IBM eServer System i computer system. However, those skilled in the art will appreciate that the disclosure herein applies equally to any computer system, regardless of whether the computer system is a complicated multi-user computing apparatus, a single user workstation, an embedded control system, or a massively parallel computer system such as a BlueGene computer system developed by IBM. As shown in FIG. 3, computer system 100 comprises one or more processors 110, a main memory 120, a mass storage interface 130, a display interface 140, and multiple network interfaces, shown in FIG. 3 as network interfaces 150A, 150B and 150N. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a network monitor 123, and a database query optimizer 125. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. Network monitor 123 is a software mechanism that monitors characteristics of the multiple networks coupled to computer system 100. The network monitor logs these characteristics as network characteristics 124. The database query optimizer includes a network selection mechanism 126 and historical information 127. When the query optimizer 125 executes a database query, it logs historical information 127 that includes choice of network information. The network selection mechanism 126 takes network choice into consideration when executing a query by looking at attributes of the query itself and/or network characteristics 124 and/or historical information 127 for the query. By taking network choice into consideration when executing a query, the query optimizer 125 may enhance the performance of the query.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, network monitor 123 and query optimizer 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a query optimizer that takes network choice into consideration may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via one or more of the network interfaces.

Network interfaces, shown in FIG. 3 as 150A, 150B, . . . , 150N are used to connect computer system 100 to other computer systems or workstations, referred to herein as nodes (e.g., 175A, 175B, . . . , 175N in FIG. 3) via separate networks (e.g., 170A, 170B, . . . , 170N). Network interfaces 150A, 150B, . . . , 150N and networks 170A, 170B, . . . , 170N broadly represent any suitable way to interconnect electronic devices, regardless of whether the network comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the query optimizer may be distributed as a program product in a variety of forms, and the claims extend to all suitable types of computer-readable media used to actually carry out the distribution. Examples of suitable computer-readable media include: recordable media such as floppy disks and CD-RW (e.g., 195 of FIG. 5), and transmission media such as digital and analog communications links.

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 4:
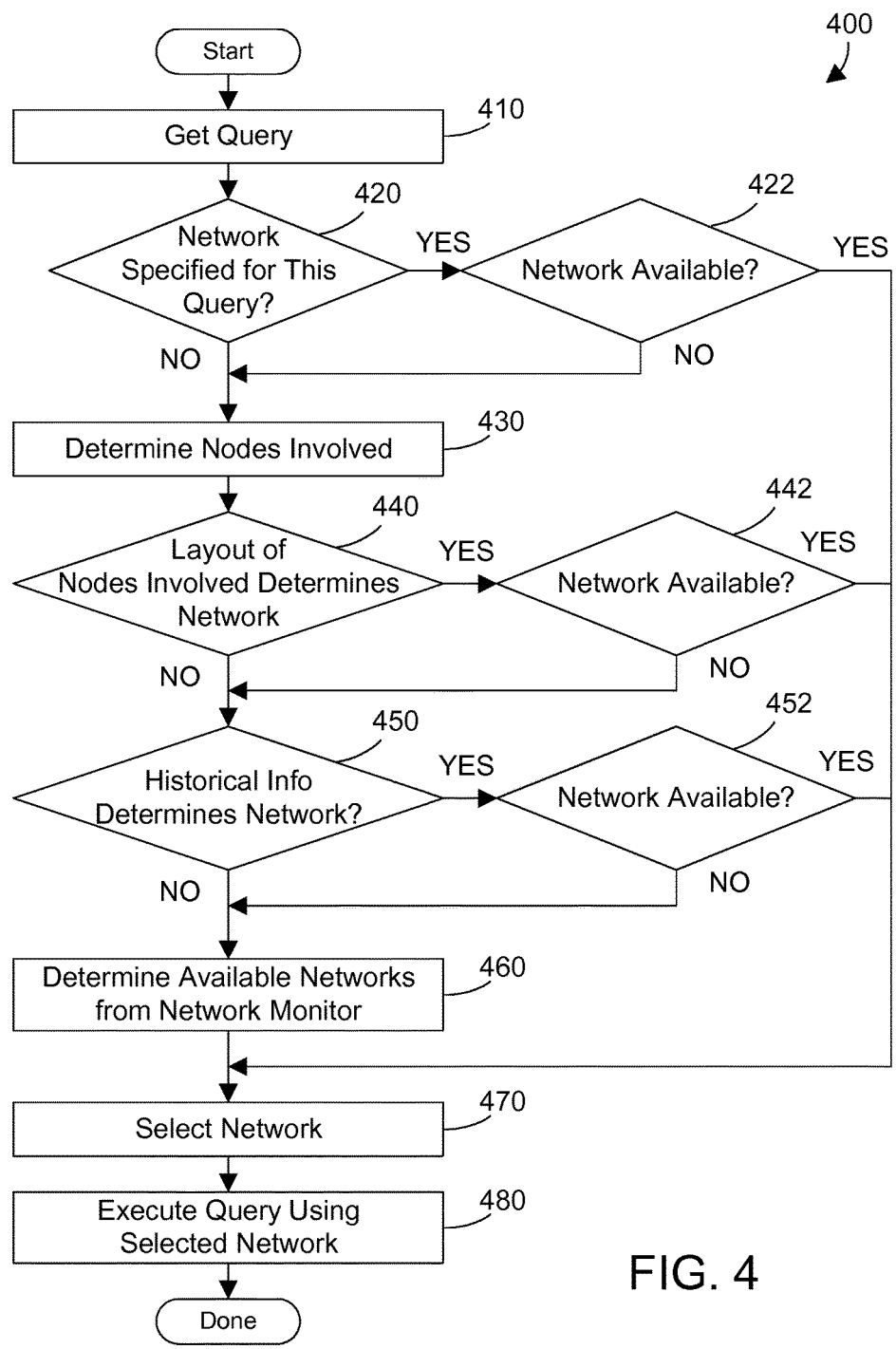
FIG. 4 is a flow diagram of a method for the query optimizer 125 in FIGS. 1 and 3 to select a network when executing a query.

Referring to FIG. 4, a method 400 is preferably performed by the query optimizer 125 in FIGS. 1 and 3. Method 400 begins by getting a query to execute (step 410). The query may include an express parameter that specifies a network, or may include an attribute associated with the query that specifies a network. Both of these are broadly construed as attributes of the query. If a network is specified for this query (step 420=YES), a check is made to see if the network is available (step 422). If so (step 422=YES), the network is selected (step 470) and the query is executed using the selected network (step 480). If the network is not available (step 422=NO), or if no network was specified for this query (step 420=NO), method 400 then determines the nodes involved in processing this query (step 430). Next, if the layout of the nodes determines which network to select (step 440=YES), and if the network is available (step 442=YES), the network is selected (step 470) and used to execute the query (step 480). If the network is not available (step 442=NO) or if the layout of the nodes does not determine which network to use (step 440=NO), method 400 determines whether historical information determines which network to select (step 450). If so (step 450=YES) and if the network is available (step 452=YES), the network is selected (step 470) and used to execute the query (step 480). If the network is not available (step 452=NO) or if historical information does not determine which network to use (step 450=NO), the available networks are determined from the network monitor (step 460). One of the available networks is selected (step 470) and used to execute the query (step 480).

Figure 5:
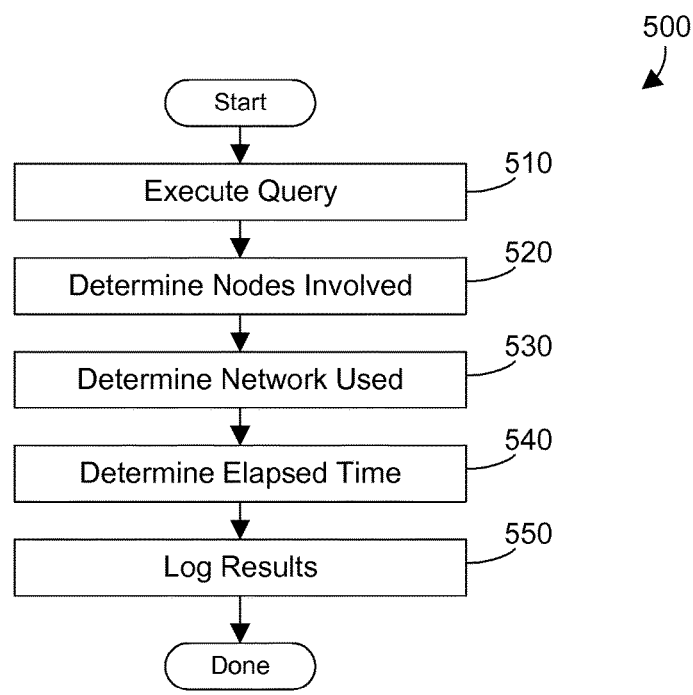
FIG. 5 is a flow diagram of a method for the query optimizer to log historical information that includes network information when the query optimizer executes a query.
Figure 6:
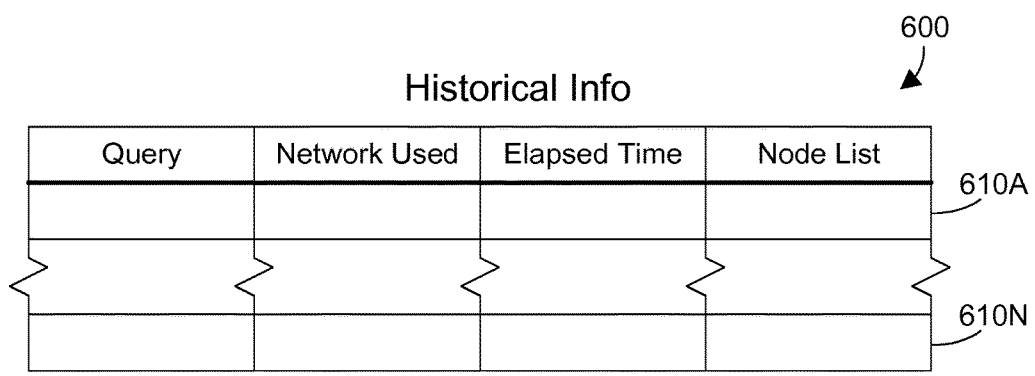
FIG. 6 is a table of historical information that correlates queries to the networks used to execute the queries.

When executing a query that involves selecting a network, the query optimizer preferably logs historical information including the network selection so this historical information may be used the next time a query is executed (e.g., see step 450 in FIG. 4). Referring to FIG. 5, a method 500 is preferably performed by the query optimizer 125 in FIGS. 1 and 3. The query is executed (step 510). The nodes involved in executing the query are determined (step 520). The network used in executing the query is determined (step 530). The elapsed time for executing the query is determined (step 540). The results determined in steps 52, 530 and 540 are then logged (step 550). One sample table 600 in FIG. 1 is one suitable implementation for the historical information 127 shown in FIGS. 1 and 3. The historical information in table 600 in FIG. 6 includes the query that was executed, the network used, the elapsed time, and the node list for the nodes that were involved in processing the query. Table 600 includes multiple entries, designated 610A, . . . , 610N in FIG. 6, to represent that records relating to different queries may be logged in the same table.

The network monitor 123 in FIGS. 1 and 3 determines the network characteristics 124 for one or more of the networks. Referring to FIG. 7, a method 700 is preferably performed by the network monitor 123. For each network (step 710), determine the current network utilization (step 720). If possible, future network utilization is predicted (step 730). Future network utilization could be predicted based on previous statistics stored in the network file. Predicted future network utilization could also be based on history if the application has been run before or has an identifiable pattern, and could be based on information provided about the application. For example, certain types of applications traditionally execute specific types of queries. Thus, financial applications might execute queries to specific nodes while scientific applications execute queries to all of the nodes. The network latency for each node is logged (step 740). The average latency is computed (step 750). The availability of the network may then be determined based on the computed average latency (step 760). For example, if the computed average latency exceeds some specified threshold level, the network would not be available, but if the computed average latency is less than or equal to the specified threshold level, the network would be available. Note that the determination of whether or not a network is "available" by the network monitor in step 760 in FIG. 7 relates to whether the network is available in steps 422, 442 and 452 in FIG. 4, and may be determined using any suitable heuristic or criteria.

Method 700 in FIG. 7 may be performed at set time intervals so the network characteristics 124 are constantly updated regardless of when they are used. Of course, in the alternative method 700 could be performed on-demand when the network characteristics are needed. The benefit of doing method 700 on-demand when the network characteristics are needed is the data will be as fresh as it can be. The downside of doing method 700 on-demand when the network characteristics are needed is the delay that will be introduced by the network monitor 123 determining the network characteristics. Having the network monitor periodically gather the network characteristics means these characteristics are readily available anytime the query optimizer needs them. The period of the interval may be adjusted as needed to balance the performance of the system with concerns of the data being too stale.

The network monitor 123 preferably stores information it determines from the networks as network characteristics 124 shown in FIGS. 1 and 3. One suitable way to store network characteristics is in a table 800 of network file records shown in FIG. 8. Network file records preferably include a network identifier, timestamp, current utilization, future utilization, and availability, as shown in FIG. 8. Table 800 preferably includes multiple records 810A, . . . , 810N.

Now we present some simple examples to illustrate how a query optimizer can take network choice into consideration when executing a database query. Let's assume a query references data stored on a single node. One suitable criteria for the query optimizer is to choose the fastest available network to the node based on the network characteristics. In a different example, we assume data is located on different nodes. For a read or write, the query optimizer could choose the network with good "gather" characteristics, such as a logical tree network. For both reads and writes, the query optimizer could choose the network with good "all-to-all" characteristics, such as a mesh or torus network. In all cases, link contention and busy networks preferably would be avoided.

Allowing a query optimizer to take network choice into consideration when executing a query is a powerful concept, especially when used in a massively parallel computer system such as a BlueGene computer system developed by IBM. BlueGene is well-suited to databases that are partitioned over a number of different nodes, thereby requiring many different nodes to be involved in processing a query. In this environment, the intelligent selection of which network to use when a query optimizer processes a query can significantly improve query performance.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, any suitable heuristic or criteria may be used to select a network for executing a database query. The disclosure and claims herein expressly extend to any suitable heuristic or criteria for a query optimizer to select a network for executing a database query. In addition, while the examples herein describe the selection of a single network for executing a query, the disclosure and claims herein expressly extend to selecting multiple networks for executing a query.

The invention claimed is:

1. An apparatus comprising:
   at least one processor;
   a memory coupled to the at least one processor;
   a plurality of network interfaces coupled to a plurality of networks that are coupled to a plurality of nodes, each of the plurality of networks comprising a communication path between at least two of the plurality of nodes, each node comprising at least one processor and memory, a first of the plurality of nodes including first data in a distributed database and a second of the plurality of nodes including second data in the distributed database;
   a network monitor that monitors characteristics of the plurality of networks and generates a log of the characteristics of the plurality of networks;
   first and second of the plurality of networks that provide alternative network connections to the first node; and
   a query optimizer residing in the memory and executed by the at least one processor, the query optimizer logging historical information for queries that indicates past network selection when executing each of the queries, the query optimizer taking network choice into consideration when executing a database query to the distributed database that retrieves the first data and the second data in the distributed database by considering the characteristics of the plurality of networks between the apparatus and the first and second nodes logged by the network monitor and by considering the past network selection in selecting at least one of the plurality of networks for executing the query, wherein the query optimizer selects one of the first and second networks for executing the query based on the historical information that includes which of the first and second networks were used during at least one previous execution of the query and based on information in the log of the characteristics of the plurality of networks that indicates characteristics of the first and second networks.

2. A networked computer system comprising:
   a plurality of nodes coupled to each other via a plurality of networks, each of the plurality of networks comprising a communication path between at least two of the plurality of nodes, each of the plurality of nodes comprising at least one processor and memory, the plurality of nodes comprising a distributed database with a first node including first data in the distributed database and a second node including second data in the distributed database and a third node;
   a network monitor that monitors characteristics of the plurality of networks and generates a log of the characteristics of the plurality of networks;
   first and second of the plurality of networks that provide alternative network connections between the third node and the first node; and
   a query optimizer executing on the at least one processor of the third node, wherein the query optimizer logs historical information for queries that indicates past network selection when executing each of the queries, wherein the query optimizer takes network choice into consideration when executing a database query to the first and second nodes in the distributed database that retrieves the first data and the second data in the distributed database by considering the characteristics of the plurality of networks between the first, second and third nodes logged by the network monitor and by considering the past network selection in selecting at least one of the plurality of networks for executing the query, wherein the query optimizer selects one of the first and second networks for executing the query based on the historical information that includes which of the first and second networks were used during at least one previous execution of the query and based on information in the log of the characteristics of the plurality of networks that indicates characteristics of the first and second networks.

3. The networked computer system of claim 2 wherein the query optimizer selects the at least one of the plurality of networks based on at least one parameter in the query that specifies which network to select when executing the query.

4. The networked computer system of claim 2 wherein the query optimizer selects the at least one of the plurality of networks based on layout of the at least two nodes involved in processing the query.

5. The networked computer system of claim 2 wherein the characteristics of the plurality of networks comprise network topology.

6. The networked computer system of claim 2 wherein the characteristics of the plurality of networks comprise network utilization.

7. The networked computer system of claim 2 wherein the characteristics of the plurality of networks comprise network latency.

8. A program product comprising software residing on non-transitory computer-readable media, the software comprising:
   a network monitor that monitors characteristics of a plurality of networks and generates a log of the characteristics of the plurality of networks;
   a query optimizer that takes network choice into consideration when executing a database query to a plurality of nodes in a distributed database that retrieves first data on a first of the plurality of nodes in the distributed database and second data on a second of the plurality of nodes in the distributed database, the plurality of nodes coupled to each other via the plurality of networks, each of the plurality of networks comprising a communication path between at least two of the plurality of nodes in the distributed database, the plurality of networks comprising first and second networks that provide alternative network connections to the first node, the query optimizer considering characteristics of the plurality of networks between the at least two nodes in selecting at least one of the plurality of networks for executing the query, wherein the query optimizer logs historical information for queries that indicates past network selection when executing each of the queries and selects one of the first and second networks for executing the query based on the historical information that includes which of the first and second networks were used during at least one previous execution of the query and based on information in the log of the characteristics of the plurality of networks that indicates characteristics of the first and second networks.

9. The program product of claim 8 wherein the query optimizer selects the at least one of the plurality of networks based on at least one parameter in the query that specifies which network to select when executing the query.

10. The program product of claim 8 wherein the query optimizer selects the at least one of the plurality of networks based on layout of the at least two nodes involved in processing the query.

11. The program product of claim 8 wherein the characteristics of the plurality of networks comprise network topology.

12. The program product of claim 8 wherein the characteristics of the plurality of networks comprise network utilization.

13. The program product of claim 8 wherein the characteristics of the plurality of networks comprise network latency.

14. A networked computer system comprising:
a first node comprising a first processor and first memory and first data in the first memory;
a second node comprising a second processor and second memory and second data in the second memory;
a third node comprising a third processor and third memory;
the first, second and third nodes coupled together via a plurality of networks, each of the plurality of networks comprising a communication path between at least two of the first, second and third nodes, the first, second and third nodes comprising a distributed database;
a network monitor coupled to the plurality of networks, the network monitor monitoring execution of a plurality of database queries to at least two of the first, second and third nodes in the distributed database, the network monitor logging nodes involved in executing each of the plurality of database queries, network used in executing each of the plurality of database queries, and elapsed time in executing each of the plurality of database queries, the network monitor further logging network characteristics for the plurality of networks, the network characteristics comprising current network utilization, predicted future network utilization, and network availability; and
a query optimizer that takes network choice into consideration when executing a database query that retrieves the first data in the first node in the distributed database and the second data in the second node in the distributed database by reading historical information logged by the network monitor including the nodes involved in at least one previous execution of the database query, the one or more networks used in the at least one previous execution of the database query, the elapsed time in the at least one previous executions of the database query, the current network utilization for the plurality of networks, the predicted future network utilization for the plurality of networks, and the availability of the plurality of networks, the query optimizer selecting at least one of the plurality of networks for executing the query based on the historical information and based on the network characteristics for the plurality of networks.

* * * * *